United States Patent
Peshkin et al.

(10) Patent No.: US 7,804,817 B1
(45) Date of Patent: Sep. 28, 2010

(54) DELAYED ONSET OF VOICE ACTIVITY DETECTION FOR JITTER ADAPTATION

(75) Inventors: Joel D. Peshkin, San Juan Capsitrano, CA (US); Karim Younes, Dana Point, CA (US); James W. Johnston, Rcho Sta Marg, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1429 days.

(21) Appl. No.: 11/187,752

(22) Filed: Jul. 22, 2005

(51) Int. Cl.
 *H04L 12/66* (2006.01)
(52) U.S. Cl. ........................ 370/352; 370/351; 370/401
(58) Field of Classification Search ............. 370/352, 370/351, 401
 See application file for complete search history.

(56) References Cited

U.S. PATENT DOCUMENTS

| | | | |
|---|---|---|---|
| 5,610,910 A * | 3/1997 | Focsaneanu et al. | 370/351 |
| 6,574,218 B1 * | 6/2003 | Cooklev | 370/352 |
| 6,990,112 B1 * | 1/2006 | Brent et al. | 370/401 |
| 2004/0022262 A1 * | 2/2004 | Vinnakota et al. | 370/429 |

* cited by examiner

*Primary Examiner*—Quynh H Nguyen
(74) *Attorney, Agent, or Firm*—Thomas, Kayden, Horstemeyer & Risley, LLP

(57) ABSTRACT

Disclosed are various systems and methods for controlling a voice activity detector. In one example approach, a method is provided in which a voice over internet protocol (VOIP) session is initiated in a first gateway with a second gateway. A plurality of jitter adaptation packets are transmitted from the first gateway to the second gateway. Also, the voice activity detector is disabled in the first gateway during the transmission of the jitter adaptation packets. The voice activity detector is enabled in the first gateway after the transmission of the jitter adaptation packets.

11 Claims, 3 Drawing Sheets

DELAYED ONSET OF VOICE ACTIVITY DETECTION FOR JITTER ADAPTATION

BACKGROUND

When a Voice-Over-Internet-Protocol (VOIP) begins, a receiving endpoint must adapt itself to the jitter behavior of the packet switched network. Unfortunately, the number of packets available for jitter adaptation by a given receiving endpoint may not be enough for proper jitter adaptation until individuals or devices transmit sound in the form of voice communication or data communication. This results in degradation of the valuable voice/data signal received at the receiving endpoint.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
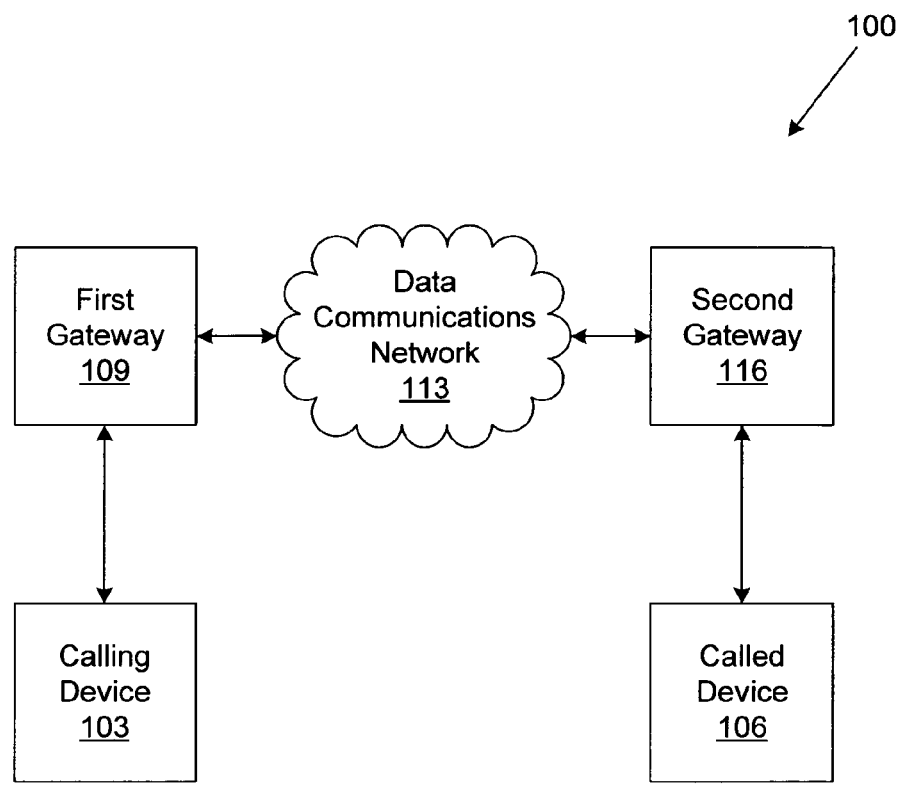
FIG. 1 is a block diagram of the devices and networks involved in a VOIP session according to an embodiment of the present invention.

Referring to FIG. 1, shown is a Voice-over-Internet Protocol (VOIP) network 100 that includes a calling device 103 and a called device 106. The calling device 103 and the called device 106 may each comprise, for example, a telephone, a facsimile machine, a data terminal device (DTE) or other device. The calling device 103 is in data communication with the called device 106 through a first gateway 109, a data communications network 113, and a second gateway 116. The data communications network 113 may comprise, for example, the Internet, a wide area network, or other network.

The calling telephone 103 and the called telephone 106 may establish communication 119 with the first gateway 109 and the second gateway, respectively, by a direct link such as, for example, through a wire or via a wireless connection, or through a telecommunications network, etc.

A user may manipulate the calling device 103 to initiate a VOIP session with the called device 106. In this respect, the user manipulates the calling device 103 to establish the session by, for example, dialing a telephone number on the calling device 103 that identifies the called device 106 in the case that the calling and called devices 103 and 106 are telephones or facsimile machines. The calling device 103 communicates with the first gateway 109 that, in turn, initiates the VOIP session with the second gateway 116 over the data communications network 113. The second gateway 116 establishes communication with the called device 106, thereby establishing the VOIP session between the calling and called devices 103 and 106.

During the course of the VOIP session between the calling and called devices 103 and 106, both the first and second gateways 109 and 116 temporarily store a plurality of packets in a "jitter" buffer. The jitter buffer allows the first and second gateways 109 and 116 to compensate for the latency of the data communications network 113. The latency of the data communications network 113 may vary over time. In this respect, the term "jitter" refers to the distortion of the transmission of a signal during a VOIP session due to the varying latency of the data communications network 113. In order to reduce the effects of jitter, both the first and second gateways 109 and 116 include a jitter adapter that determines a desirable number of packets that are stored in a jitter buffer in an attempt to make sure that the gateway 109 or 116 has a desirable number of data packets on hand from which the respective voice or data signal may be reproduced and passed on to the calling or called devices 103 or 106. The desirable number of data packets is specified so as not to create too much delay that might otherwise degrade the communications performed during the VOIP session.

In order to perform jitter adaptation, the jitter adapter in the first and second gateways 109 and 116 may add periods of silence into the data stream, or may discard packets as is deemed necessary to provide optimum performance. At or near the startup of the VOIP session, the jitter adaptation that is performed is somewhat aggressive, where a default number of packets are stored in the jitter buffer of the respective gateway 109 and 116. From there, the respective jitter adapter acts to determine the optimum number of packets that are to be stored in the jitter buffer during the VOIP session based upon the latency of the data communications network 113 experienced during the VOIP session.

Each of the gateways 109 and 116 also include a voice activity detector (VAD) that is employed to detect when voice or other communication activity occurs that is to be transmitted to the other gateway 109 or 116. In this respect, the transmission of a signal by either gateway 109 or 116 to the other one of the gateways 109 or 116 occurs only when there is voice or other communication activity to transmit. This reduces the amount of data communication that is sent over the data communications network 113, thereby preventing the transmission of data that unnecessarily uses up network bandwidth.

According to various embodiments of the present invention, when the VOIP session is first established between the first and second gateways 109 and 116, the first gateway 109 transmits a plurality of jitter adaptation packets to the second gateway 116. The jitter adaptation packets transmitted from the first gateway 109 to the second gateway 116 allow the second gateway 116 to adapt its jitter buffer as can be appreciated. Similarly, the second gateway 116 transmits jitter adaptation packets to the first gateway 109 as soon as the second gateway 116 is able so that the first gateway 109 may perform jitter adaptation. In this respect, the second gateway 116 transmits the jitter adaptation packets as soon as it has received the information from the first gateway 109 indicating, among other parameters, the IP address of the first gateway 109, etc., thereby providing the information that allows the jitter adaptation packets to be sent to the first gateway 109.

According to various embodiments of the present invention, during the transmission of the jitter adaptation packets by either the first or second gateway 109 or 116 to the other one of the gateways 109 or 116, the voice activity detector in the respective first or second gateway 109 or 116 is disabled. As contemplated herein, the voice activity detector may be disabled by either ignoring its output, disabling its operation outright, or performing some other operation so that, in effect, the voice activity detector is no longer able to exert control over whether packets are transmitted to the network 113 by the respective gateway 109 or 116. It follows then, that the voice activity detector may be enabled by performing an action that is opposite of that performed to disable the voice activity detector as described above. In this respect, the voice activity detector controls the "Discontinuous Transmission" (DTX) of the respective gateway 109/116. Discontinuous Transmission refers to the fact that when the voice activity detector is enabled, the transmission is not continuous, but occurs when voice or other activity is detected. By disabling the voice activity detector as described above, discontinous transmission is correspondingly disabled. When discontinuous transmission is disabled, a continuous stream of packets is transmitted.

Once a desired number of jitter adaptation packets have been transmitted by the respective gateway 109 or 116, then the voice activity detector of the respective gateway 109 or 116 is enabled to limit the transmission to actual voice or other communication. By disabling the voice activity detector in this manner, in a typical situation a plurality of packets of "silence" are inevitably transmitted at the beginning of the VOIP session that do not include voice or other communication. These packets are the jitter adaptation packets. In this respect, jitter adaptation packets are defined herein as packets transmitted by a first one of the gateways 109 or 116 to a second one of the gateways 109 or 116 to facilitate jitter adaptation in the second one of the gateways 109 or 116. While it is typical that silence is transmitted with such packets, it is possible that some sound may be transmitted in the jitter adaptation packets as well.

In this respect, the jitter adaptation packets may comprise the initial or first number of the packets transmitted, for example, by the first gateway 109 to the second gateway 116. Alternatively, the jitter adaptation packets may be transmitted, for example, by the first gateway 109 to the second gateway 116 after the first gateway 109 has received a first packet from the second gateway 116 during the course of the setup of the VOIP session. The latter approach assumes, for example, that the first gateway 109 initiated the call. In this respect, the first gateway 109 determines whether a packet has been received from the second gateway 116 before transmitting the jitter adaptation packets to the second gateway 116. This may be advantageous as, upon receiving a first packet from the second gateway 116, the first gateway 109 knows that the second gateway 116 is ready to receive packets. This ensures that the second gateway 116 will receive most, if not all, of the jitter adaptation packets transmitted by the first gateway 109 barring any losses that may normally occur on the network 113.

In one embodiment, a minimum required number of the jitter adaptation packets are transmitted from the first gateway 109 to the second gateway 116. This minimum required number of the jitter adaptation packets is at least as great as the number of jitter adaptation packets needed to allow a jitter adapter to substantially adapt the number of packets held in a jitter buffer associated with the jitter adapter. In order to ensure that the minimum required number of jitter adaptation packets are transmitted, the first gateway 109 may employ one of a number of approaches described below in order to track the approximate total number of jitter adaptation packets that have been transmitted to the second gateway 116. In each of these approaches, it is assumed, for example, that the first gateway 109 is associated with the calling device 109 and initiates the VOIP session with the second gateway 116.

In one embodiment, the first gateway 109 counts the jitter adaptation packets transmitted to the second gateway 116 to ensure that the second gateway 116 receives a predefined quantity of jitter adaptation packets. The predefined quantity of jitter adaptation packets is specified so as to ensure, to the extent possible, that the minimum required number of jitter adaptation packets have been transmitted. Likewise, the second gateway 116 may be configured to count the number of jitter adaptation packets transmitted to the first gateway 109 to ensure, to the extent possible, that the predefined quantity of jitter adaptation packets have been transmitted.

In one implementation, the counting of the jitter adaptation packets in the first gateway 109 may begin upon transmission of the very first packet by the first gateway 109 to the second gateway 116. In this implementation, given that the first gateway 109 does not initially know whether the second gateway 116 is receiving the jitter adaptation packets as the first gateway 109 has yet to receive any packets from the second gateway 116 before the first gateway 109 transmits jitter adaptation packets, it may be the case that the second gateway 116 does not actually receive the first several jitter adaptation packets from the first gateway 109. As such, in one example implementation, the predefined quantity of jitter adaptation packets transmitted by the first gateway 109 may include an estimated number of jitter adaptation packets that may be potentially discarded in addition to the minimum required number of adaptation packets to ensure that the second gateway 116 receives the minimum required number of jitter adaptation packets for proper jitter adaptation, where it is contemplated that at least a few of the jitter adaptation packets may be lost.

In a second implementation, the counting of the jitter adaptation packets may begin after a first packet has been received by the first gateway 109 from the second gateway 116 during the setup of the VOIP session. Given that the first gateway 109 has initiated the VOIP session, the fact that a packet has been received by the first gateway 109 from the second gateway 116 indicates that the second gateway 116 is receiving packets from the first gateway 109. The predefined quantity of jitter adaptation packets transmitted by the first gateway 109 may be specified, for example, as the minimum required number of jitter adaptation packets needed or other number. The predefined quantity of jitter adaptation packets may be the minimum required number of jitter adaptation packets since the first gateway 109 knows that the second gateway 116 is receiving most, if not all of the packets at such time.

The second gateway 116 may also count the number of jitter adaptation packets it sends to the first gateway 109. The predefined quantity of jitter adaptation packets specified for transmission may be the minimum required number of jitter adaptation packets since the second gateway 116 knows that the first gateway 109 is receiving packets as the VOIP session was initiated by the first gateway 109. Thus, the second gateway 116 can assume that most if not all of the jitter adaptation packets have been received by the first gateway 109.

In another approach, the determination as to whether the predefined quantity of jitter packets has been transmitted from the first gateway 109 to the second gateway 116 is made by tracking a time period in the first gateway 109 within which the jitter adaptation packets are transmitted. This assumes, for example, that the jitter adaptation packets are transmitted at a given rate. The time period may begin, for example, at the initial startup of the VOIP session such as, for example, before the transmission of jitter adaptation packets begins. In such case, a timer may be initiated in the first gateway before the transmission of the jitter adaptation packets to the second gateway to track the passing of the time period.

The time period may be specified so as to ensure to the extent possible that the predefined quantity of packets transmitted includes the minimum required number of jitter adaptation packets needed to substantially adapt the second gateway 116, assuming the packets are transmitted at a known rate. In this respect, the predefined quantity of jitter adaptation packets includes an estimated number of potentially discarded jitter adaptation packets due to the fact that the second gateway 116 may not be initially ready to receive some of the jitter adaptation packets transmitted as was discussed above.

Alternatively, the time period tracked by the first gateway 109 may begin, for example, after a first packet has been received from the second gateway 116. By virtue of the fact that a first packet has been received from the second gateway 116, then the first gateway 109 knows that the second gateway 116 is ready to receive the jitter adaptation packets. In such case the time period may be specified so as to ensure to the extent possible that the minimum number of jitter adaptation packets needed for jitter adaptation are transmitted.

Figure 2:
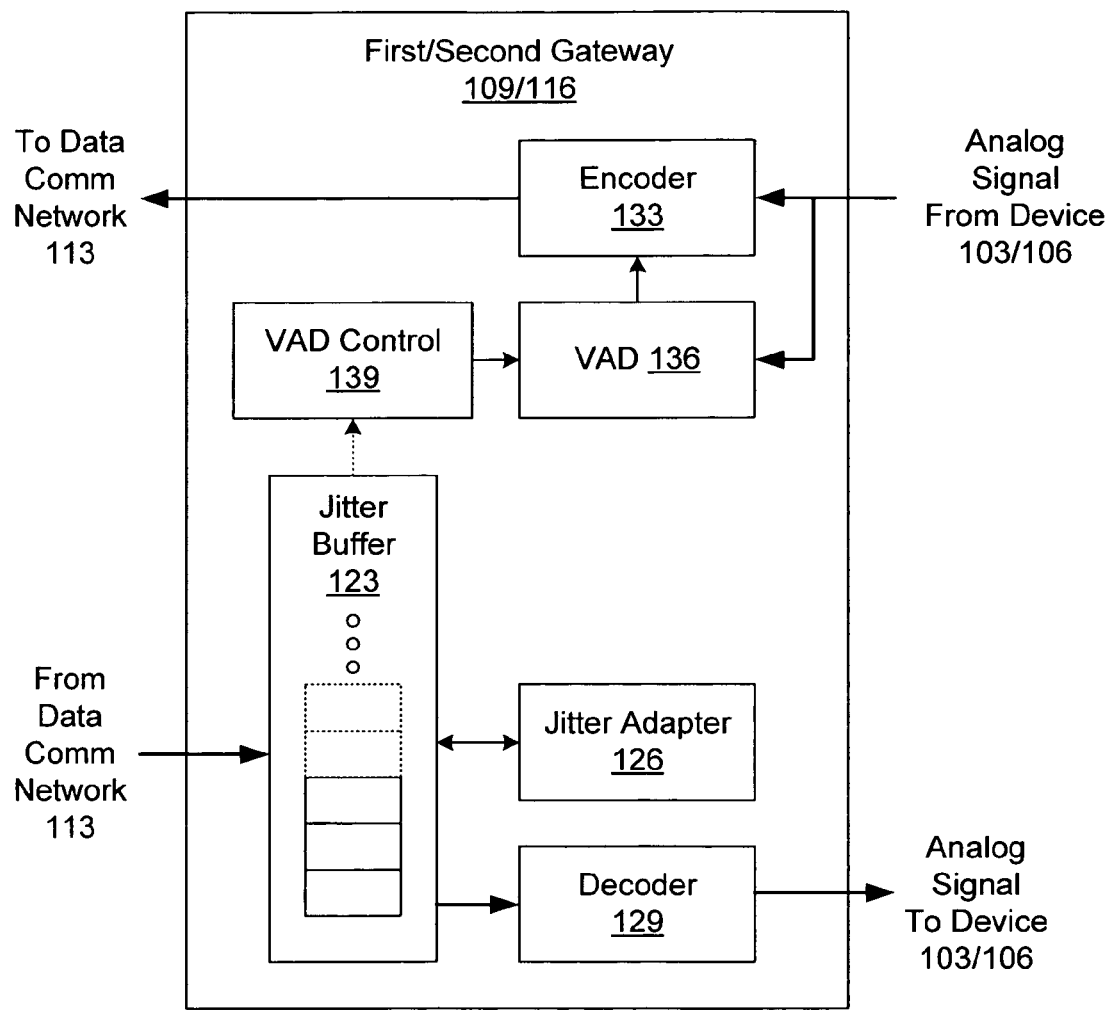
FIG. 2 is a block diagram of a gateway employed as one of the devices conducting the VOIP session of FIG. 1 according to an embodiment of the present invention.

Turning to FIG. 2, shown is a block diagram that provides one example of a gateway 109/116, according to an embodiment of the present invention. The gateway 109/116 includes a jitter buffer 123 into which data from the data communications network 113 is placed. The jitter buffer 123 is adapted by the jitter adapter 126 that determines the number of data packets stored in the jitter buffer 123 during communications with the transmitting gateway 109/113 based upon the jitter behavior of the network 113. The gateway 109/116 includes a decoder 129 that decodes the data packets received and generates the corresponding analog voice or data signal that is applied to the respective device 103/106 (FIG. 1) such as a telephone or facsimile machine. The gateway 109/116 also includes an encoder 133 that adapts an analog voice signal or data signal from the calling or called device 103/106 and converts the signal to digital data that is packaged into packets that are then transmitted to the receiving gateway 109/116 via the data communications network 113.

The gateway 109/116 also includes a voice activity detector (VAD) 136 that determines whether the encoder 133 is to generate packets representative of the signal received from the respective device 103/106. In this respect, the VAD 136 receives the signal from the calling or called device 103/106 and detects whether a signal is being generated that is to be transmitted across the communications network 113 that is of value as opposed to signals of little or no value such as silence. A signal that is of value may be, for example, a voice signal or data signal. In the case that the signal is silence, it may be that static is transmitted or background noise generated by the calling or called device 103/106. The VAD 136 enables the encoder 133 to generate and transmit packets to the data communications network 113 based upon the signal received from the calling or called device 103/106 accordingly. Thus, if there is no voice activity, for example, then the VAD 136 prevents the encoder 133 from sending a signal to the data communications network 113.

The gateway 109/116 also includes a VAD control 139. The VAD control 139 determines whether the operation of the voice activity detector 136 is enabled. When the voice activity detector 136 is disabled, the encoder 133 continuously generates packets associated with the signal received from the calling and called devices 103/106. In this respect, the encoder 133 transmits data packets 113 without regard as to the nature of the signal received from a calling or called device 103/106. When the VAD 136 is enabled, then it controls when the encoder 133 generates packets based upon the nature of the signal received from the calling or called devices 103/106 as described above.

The VAD control 139 determines when the VAD 136 is to be enabled. According to the various embodiments of the present invention, the VAD control 139 disables the VAD 136 when the jitter adaptation packets are being transmitted by the gateway 109/116. In this respect, the VAD control 139 may disable the VAD 136 during the specified time periods as described above, or the VAD control 139 may track the number of packets transmitted from the encoder 133 to the data communications network 113 in order to ensure that the appropriate number of jitter adaptation packets have been transmitted as was described above.

Figure 3:
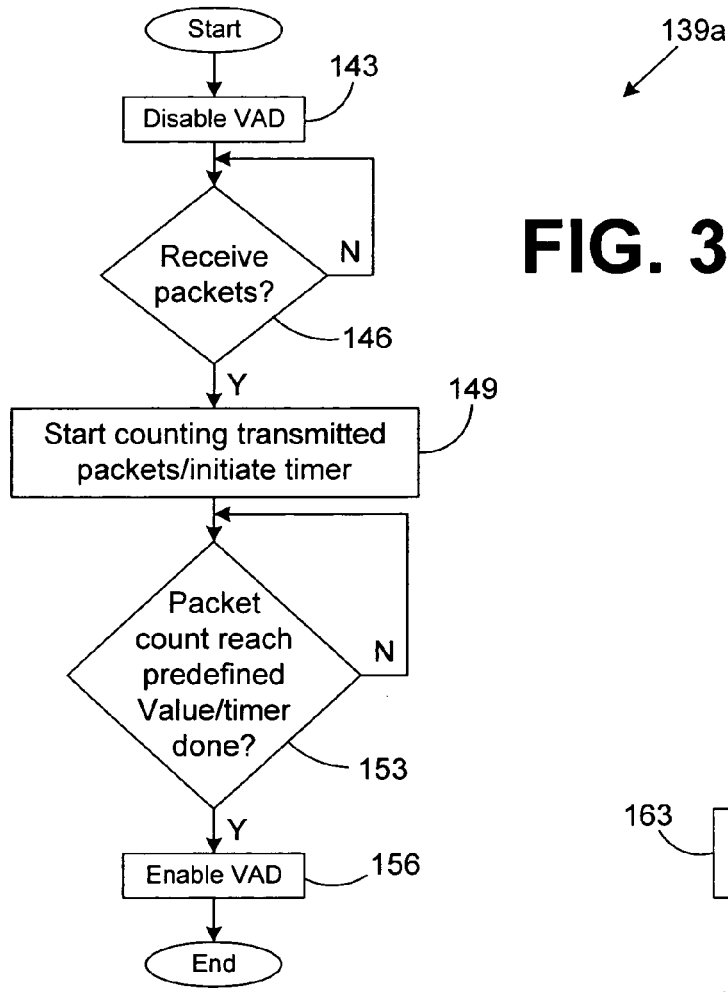
FIG. 3 is a flow chart that illustrates one example of a voice activity detector (VAD) control employed in the gateway of FIG. 2 according to an embodiment of the present invention.

Referring next to FIG. 3, shown is a flow chart that provides one example of the operation of the VAD control 139, denoted herein as VAD control 139a, according to an embodiment of the present invention. Alternatively, the flow chart of FIG. 3 may be viewed as depicting steps of an example of a method implemented in the computer system 100 to control enabling and disabling of the VAD 136 (FIG. 2) as described herein. The functionality of the VAD control 139a as depicted by the example flow chart of FIG. 3 may be implemented, for example, in an object oriented design or in some other programming architecture. Assuming the functionality is implemented in an object oriented design, then each block represents functionality that may be implemented in one or more methods that are encapsulated in one or more objects. The VAD control 139a may be implemented using any one of a number of programming languages such as, for example, C, C++, Assembly, or other appropriate programming languages.

The VAD control 139a is executed, for example, in the first gateway 109 in which jitter adaptation packets are transmitted after a first packet has been received from the second gateway 116 as described above. In this scenario, the first gateway 109 is associated with the calling device 103 and initiates the VOIP session as shown in FIG. 1. Alternatively, the VAD control 139 may be executed in the second gateway 116 as described below.

The VAD control 139a is executed upon the initiation of a VOIP session between, for example, the first gateway 109 and the second gateway 116 (FIG. 1). To begin, in box 143 the VAD control 139a disables the voice activity detector 136. Thereafter, in box 146, assuming the VAD control 139a is executed in the first gateway 109, the VAD control 139a determines whether a first packet has been received from the second gateway 116. Alternatively, if the VAD control 139a is executed in the second gateway 116, then box 146 may be skipped as it is assumed that the first gateway 103 is receiving packets as it initiated the VOIP session.

Next, in box 149, the VAD control 139a commences counting transmitted packets if such an approach is employed to track whether the minimum required number of jitter adaptation packets is transmitted to the peer gateway 109/116. Alternatively, the VAD control 139a may initiate the operation of a timer with which to track a time period during which jitter adaptation packets are transmitted to the peer gateway 109/116. Then, in box 153, the VAD control 139a determines whether the packet count has reached a predefined value indicating that at least the minimum required number of jitter adaptation packets has been transmitted to the opposing gateway 109/116. Alternatively, in box 153, the VAD control 139a may determine whether the time period tracked by the timer initiated in box 149 has elapsed. Assuming that the packet count has reached the predefined value or the time period tracked by the timer initiated in box 149 has elapsed, then the VAD control 139a proceeds to box 156 in which the voice activity detector 136 is enabled for future operation during the VOIP session.

Figure 4:
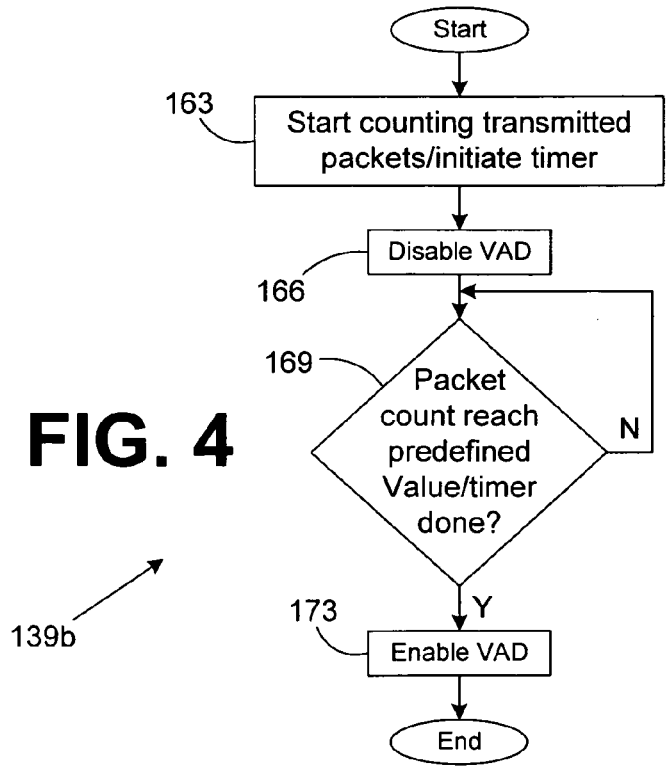
FIG. 4 is a flow chart that illustrates one example of a voice activity detector (VAD) control employed in the gateway of FIG. 2 according to an embodiment of the present invention.

Referring next to FIG. 4, shown is a flow chart that provides another example of the operation of the VAD control 139, denoted herein as VAD control 139b, according to an embodiment of the present invention. Alternatively, the flow chart of FIG. 4 may be viewed as depicting steps of an example of a method implemented in the computer system 100 to control enabling and disabling of the VAD 136 (FIG. 2) as described herein. The functionality of the VAD control 139b as depicted by the example flow chart of FIG. 4 may be implemented, for example, in an object oriented design or in some other programming architecture. Assuming the functionality is implemented in an object oriented design, then each block represents functionality that may be implemented in one or more methods that are encapsulated in one or more objects. The VAD control 139b may be implemented using any one of a number of programming languages such as, for example, C, C++, Assembly, or other appropriate programming languages.

The VAD control 139b is implemented in approaches where the packet count or timer is initiated in the first gateway 109 at the beginning of the VOIP session as opposed to when a first packet has been received by the first gateway 109 from the second gateway 116 as described above. In this respect, the packet count or timer operation is potentially initiated before it is absolutely known that the opposing gateway 109/116 has commenced receiving packets as was described above.

Beginning with box 163, the VAD control 139b commences counting jitter adaptation packets transmitted to the second gateway 116, or, a timer is initiated to track a time period within which the jitter adaptation packets are transmitted to the second gateway 116. Thereafter, in box 166, the VAD control 139b disables the voice activity detector 136 (FIG. 2). Next, in box 169, the VAD control 139b determines whether the predefined value has been reached for the packet count, or whether the respective time period tracked by the timer has elapsed. If so, then in box 173, the VAD control 139b enables the voice activity detector 136. Thereafter, the VAD control 139b ends as shown.

Although the VAD control 139 may be embodied in software or code executed by general purpose hardware, or embodied in dedicated hardware or a combination of software/general purpose hardware and dedicated hardware. If embodied in dedicated hardware, the VAD control 139 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 3 and 4 show the architecture, functionality, and operation of an implementation of the VAD control 139. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the VAD control 139 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the VAD control 139 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method for controlling a voice activity detector, comprising the steps of:
    initiating in a first gateway a voice over internet protocol (VOIP) session with a second gateway;
    transmitting a plurality of jitter adaptation packets from the first gateway to the second gateway;
    disabling the voice activity detector in the first gateway during the transmission of the jitter adaptation packets;
    enabling the voice activity detector in the first gateway after the transmission of the jitter adaptation packets;
    determining whether a packet has been received in the first gateway from the second gateway, wherein the jitter adaptation packets are transmitted after the packet has been received in the first gateway; and
    counting the jitter adaptation packets transmitted to the second gateway after the packet has been received in the first gateway, wherein the voice activity detector is enabled after a predefined quantity of the jitter adaptation packets is transmitted from the first gateway to the second gateway;

wherein the jitter adaptation packets transmitted from the first gateway to the second gateway comprise an initial number of packets transmitted by the first gateway to the second gateway.

2. The method of claim 1, further comprising the step of transmitting the jitter adaptation packets to the second gateway for a predefined period of time after the packet has been received in the first gateway, wherein the voice activity detector is enabled after the predefined period of time has elapsed.

3. The method of claim 1, further comprising the step of initiating a timer in the first gateway before a transmission of the jitter adaptation packets from the first gateway to the second gateway, wherein the voice activity detector is enabled when the timer indicates that a predefined period of time has elapsed.

4. The method of claim 1, wherein a minimum required number of the jitter adaptation packets is transmitted from the first gateway to the second gateway, wherein the minimum required number of the jitter adaptation packets is at least as great as an amount of jitter adaptation packets for a jitter adapter to substantially adapt the number of packets held in a jitter buffer associated with the jitter adapter.

5. A system in a first gateway for controlling a voice activity detector (VAD), comprising:
a VAD controller configured to:
disable the VAD in the first gateway during a transmission of a plurality of jitter adaptation packets to a second gateway;
enable the VAD in the first gateway after the transmission of the jitter adaptation packets;
determine whether a packet has been received in the first gateway from the second gateway, wherein the jitter adaptation packets are transmitted after the packet has been received in the first gateway; and
count the jitter adaptation packets transmitted to the second gateway after the packet has been received in the first gateway, and to enable the voice activity detector after a predefined quantity of the jitter adaptation packets is transmitted from the first gateway to the second gateway;
wherein the jitter adaptation packets further comprise an initial number of packets transmitted by the first gateway to the second gateway.

6. The system of claim 5, wherein the VAD controller tracks a passing of a predefined period of time after the packet has been received in the first gateway, wherein the jitter adaptation packets are transmitted to the second gateway during the predefined period of time and the VAD controller is configured to enable the VAD after the predefined time has elapsed.

7. The system of claim 5, wherein the VAD controller is further configured to track a predefined period of time with a timer in the first gateway, the predefined period of time beginning before a transmission of the jitter adaptation packets from the first gateway to the second gateway, the jitter adaptation packets being transmitted during the predefined period of time, wherein the VAD controller is configured to enable the VAD after the predefined period of time has elapsed.

8. The system of claim 5, wherein a minimum required number of the jitter adaptation packets is transmitted from the first gateway to the second gateway, wherein the minimum required number of the jitter adaptation packets is at least as great as an amount of jitter adaptation packets for a jitter adapter to substantially adapt the number of packets held in a jitter buffer associated with the jitter adapter.

9. A system in a first gateway for controlling a voice activity detector (VAD), comprising:
means for disabling the VAD in the first gateway during a transmission of a plurality of jitter adaptation packets to a second gateway;
means for enabling the VAD in the first gateway after the transmission of the jitter adaptation packets;
means for determining whether a packet has been received in the first gateway from the second gateway, wherein the jitter adaptation packets are transmitted after the packet has been received in the first gateway;
means for counting the jitter adaptation packets transmitted to the second gateway after the packet has been received in the first gateway; and
means for enabling the voice activity detector after a predefined quantity of the jitter adaptation packets is transmitted from the first gateway to the second gateway;
wherein the jitter adaptation packets further comprise an initial number of packets transmitted by the first gateway to the second gateway.

10. The system of claim 9, further comprising means for tracking a passing of a predefined period of time after the packet has been received in the first gateway, wherein the jitter adaptation packets are transmitted to the second gateway during the predefined period of time and the VAD controller is configured to enable the VAD after the predefined period of time has elapsed.

11. The system of claim 9, further comprising:
means for tracking a predefined period of time with a timer in the first gateway, the predefined period of time beginning before a transmission of the jitter adaptation packets from the first gateway to the second gateway, the jitter adaptation packets being transmitted during the predefined period of time; and
wherein the means for enabling the VAD in the first gateway after the transmission of the jitter adaptation packets further comprises means for enabling the VAD after the predefined period of time has elapsed.

* * * * *